US007954371B2

(12) United States Patent
Schofield et al.

(10) Patent No.: US 7,954,371 B2
(45) Date of Patent: Jun. 7, 2011

(54) CONDITION MONITORING OF PUMPS AND PUMP SYSTEM

(75) Inventors: Nigel Paul Schofield, Horsham (GB); Siamak Abbaszadeh, Yokohama (JP); Derek Savidge, Shoreham By Sea (GB)

(73) Assignee: Edwards Limited, Crawley, West Sussex (GB)

( * ) Notice: Subject to any disclaimer, the term of this patent is extended or adjusted under 35 U.S.C. 154(b) by 364 days.

(21) Appl. No.: 10/535,390

(22) PCT Filed: Jul. 21, 2003

(86) PCT No.: PCT/GB03/03167

§ 371 (c)(1),
(2), (4) Date: May 18, 2005

(87) PCT Pub. No.: WO2004/011810

PCT Pub. Date: Feb. 5, 2004

(65) Prior Publication Data

US 2006/0162438 A1 Jul. 27, 2006

(30) Foreign Application Priority Data

Jul. 29, 2002 (GB) .................................. 0217494.4

(51) Int. Cl.
*G01M 19/00* (2006.01)

(52) U.S. Cl. ......................................................... 73/168

(58) Field of Classification Search ..................... 73/168
See application file for complete search history.

(56) References Cited

U.S. PATENT DOCUMENTS 3,330,159 A 7/1967 Ongaro
3,845,288 A 10/1974 Cornyn, Jr. et al.
5,336,053 A 8/1994 Wynkoop
5,499,530 A * 3/1996 Vondell et al. ................. 73/49.7
6,045,331 A * 4/2000 Gehm et al. ....................... 417/2
6,220,086 B1 4/2001 Andrew et al.
(Continued)

FOREIGN PATENT DOCUMENTS

EP 0 485 367 A2 5/1992
(Continued)

OTHER PUBLICATIONS

Abstract of SU 541927 A entitled Excavators Hydraulics Load Testing Rig—Has Electronic Load Simulator In Second Hydraulic System Between Pump And Cylinder, Which Introduces Unusual Conditions; CONS ROAD MACH Jan. 5, 1977.

(Continued)

*Primary Examiner* — Hezron Williams
*Assistant Examiner* — Nashmiya Fayyaz

(57) ABSTRACT

A method of monitoring the condition of a pump (10) or at least one component of a system that includes a pump which component or components are not a part of the pump, includes the step of generating a predetermined test condition in the pump or system component or components. During a period in which such a test condition is present, signals indicative of the pump or system component or components are obtained. Wear in the pump bearings, the build-up of deposits in the pump or in pipework forming a part of the pump system can be detected or predicted and corrective action taken before the pump or system fails. By providing a method of monitoring pump or system condition in-situ, it is possible to reduce the likelihood of pump failure in use and the need to carry out over frequent servicing of the pump.

16 Claims, 2 Drawing Sheets

U.S. PATENT DOCUMENTS

| | | | | |
|---|---|---|---|---|
| 6,260,004 | B1 | 7/2001 | Hays et al. | |
| 6,536,271 | B1 * | 3/2003 | Gopalakrishnan et al. | 73/168 |
| 6,619,111 | B2 * | 9/2003 | Soneda et al. | 73/168 |
| 6,648,606 | B2 * | 11/2003 | Sabini et al. | 417/53 |
| 2002/0152807 | A1 * | 10/2002 | Sabini et al. | 73/168 |
| 2005/0022589 | A1 * | 2/2005 | Du | 73/168 |
| 2006/0096363 | A1 * | 5/2006 | Sawada | 73/168 |

FOREIGN PATENT DOCUMENTS

| | | | | |
|---|---|---|---|---|
| EP | 828332 | A1 | * | 3/1998 |
| EP | 1 031 358 | A1 | | 8/2000 |
| EP | 1 072 795 | A1 | | 1/2001 |
| EP | 1 160 450 | A2 | | 12/2001 |
| GB | 1416168 | A | * | 12/1975 |
| JP | 2004338016 | A | * | 12/2004 |
| JP | 2005351252 | A | * | 12/2005 |
| SU | 541927 | A | | 1/1977 |

OTHER PUBLICATIONS

International Search Report of International Appln. No. PCT/GB 03/03167; date of mailing of International Search Report: Nov. 5, 2003.

United Kingdom Search Report for Application No. GB 0217494.4; Date of search: Apr. 30, 2003.

United Kingdom Search Report for Application No. GB 0217494.4; Date of search: Feb. 24, 2003.

* cited by examiner

CONDITION MONITORING OF PUMPS AND PUMP SYSTEM

FIELD OF THE INVENTION

The invention relates to condition monitoring of pumps and pump systems, and particularly, but not exclusively to condition monitoring of dry pumps.

BACKGROUND OF THE INVENTION

It is known to monitor dry pump condition by observing surges in motor torque or current. This is not, however, an ideal method of predicting pump failure. A pump will usually operate without any noticeable problem while deposits gradually build-up in the running clearances. This build-up usually takes place over a long period of time and eventually there will be contact, or rubbing, between two parts. When this happens, the heat generated causes thermal expansion, thus increasing the rubbing and causing further thermal expansion, often leading to seizure and pump failure. This contact, or rubbing, can be detected as a surge in motor current. However, the time between detection of a current surge and pump failure can be short, and in the case of a dry pump there is usually insufficient time to take action following the detection of a current surge.

Pump failure due to seizure is always undesirable, but is even more of a problem where the pump is being used in a manufacturing process and the pump failure leads to the loss of a batch of product. For example, if a vacuum pump fails during the production of semi conductors, typically the batch of parts affected has to be rejected, which can be very expensive. In order to avoid the problem, pumps can be stripped down and parts replaced or cleaned as part of a planned period maintenance system. However, this can result in unnecessary expense as to be safe, the pumps have to be serviced more frequently than is actually necessary.

In addition to problems associated with deposits forming in pumps, the efficiency of a pump and the system in which it operates can be adversely affected by the build-up of process by-products in the pump exhaust, piping connected to the exhaust and/or the pump itself.

Yet another problem with pumps that can lead to pump failure is undetected bearing wear.

BRIEF SUMMARY OF THE INVENTION

It is an object of the invention to at least in part alleviate one or more of these problems.

The invention provides a method of monitoring the condition of a pump or a component of a system comprising a pump which component is not a component of the pump, the method comprising the steps of generating a predetermined test condition in said pump or system component and obtaining signals indicative of a condition of said pump or system during a period in which said test condition is present.

The invention also includes apparatus comprising a pump, pump controller and at least one sensing device for sensing a pump operating parameter, said pump controller being able to control said pump so as to selectively generate a predetermined pump test condition and the or each said sensing device providing signals indicating values of said parameter when said test condition is generated.

The invention also includes apparatus comprising a pump, a controller, an exhaust conduit extending from said pump, at least one sensing device for sensing a condition in said conduit, a connection associated with said pump and or conduit for connecting said pump and or conduit with a source of pressurised gas and valving for controlling flow of said gas into said pump and/or conduit, said controller being able to control said valving to selectively admit said gas into said pump and/or conduit so as to generate a predetermined test condition in said conduit and the or each said sensor providing signals indicative of said condition in the conduit when said test condition is generated.

In order that the invention may be well understood, embodiments thereof, which are given by way of example only, will now be described with reference to the drawings, in which:

DETAILED DESCRIPTION OF THE INVENTION

Figure 1:
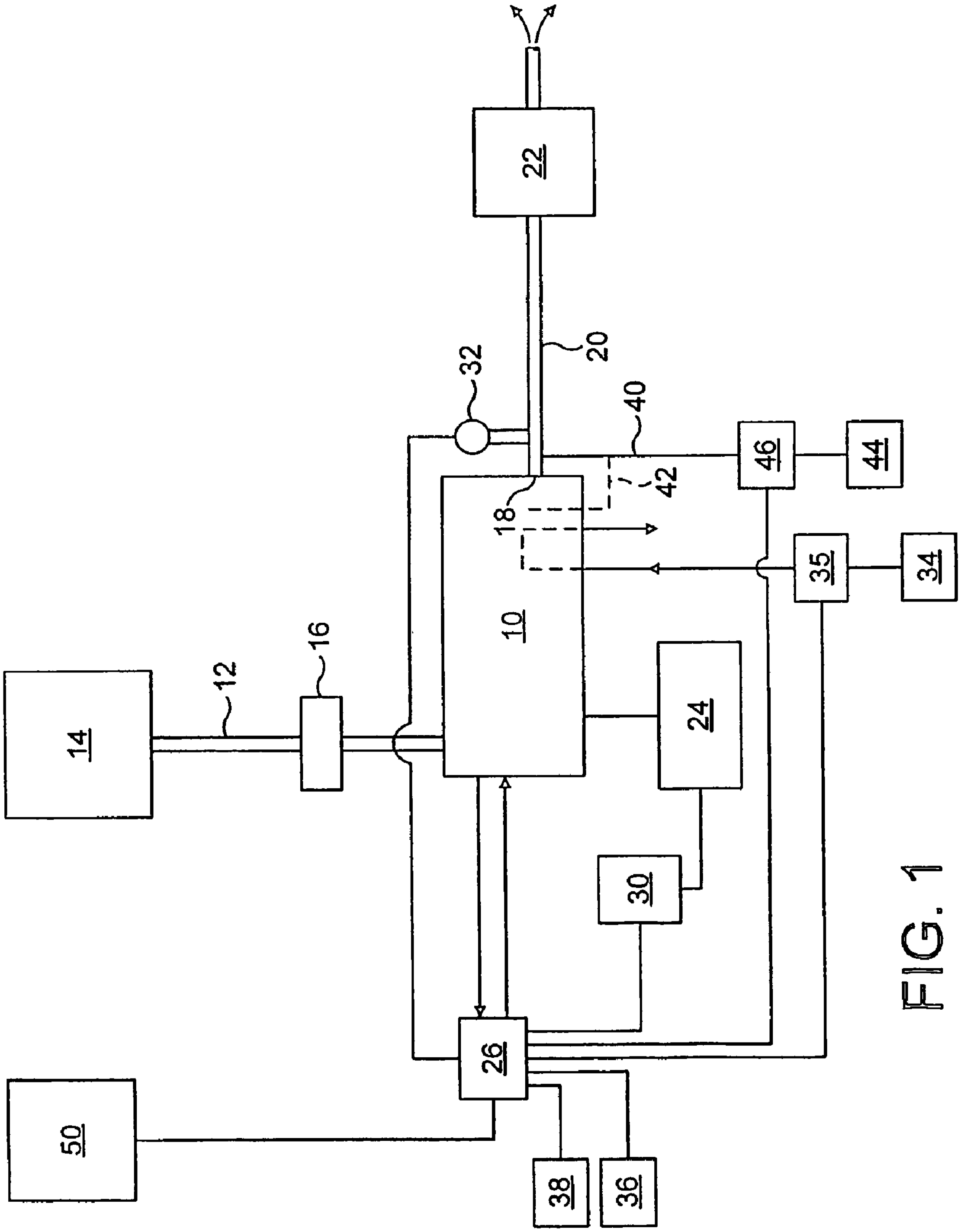
FIG. 1 is a block diagram illustrating a pump system.

Referring to FIG. 1, a system is shown in which a pump 10 is connected to a pipe, or conduit, 12 running from a process chamber 14. The process chamber could be one in which, for example, semi conductors are processed. An isolation valve 16 is typically provided in the conduit 12 between the pump and the process chamber.

The pump exhaust 18 is connected to a conduit 20 leading to an abatement system 22. An abatement system, as is well known to those skilled in the art, is a filtering or treatment system for cleaning the exhaust gases. The pump exhaust 18 and the conduit 20 define a passage for exhaust from the pump.

The pump 10 comprises a stator and a rotor (not separately illustrated) and includes an electric motor 24 by which the rotor is driven. In the illustration, the motor is shown outside of the pump. However, it will be appreciated that this is for ease of illustration and, as is well known in the art, the motor may be disposed internally or externally of the pump casing and suitable gearing may be provided between the motor and the rotor.

The pump has a controller 26 which will typically comprise a processor and some memory capacity. Typically, the controller will be an integral part of the pump, but it may instead be provided as a separate unit, or could be a PC that communicates with the pump via suitable interfaces.

A sensor 30 is associated with the motor and is provided to detect motor torque or the current supplied to the motor. Any suitable sensor may be used. One example is a current clamp probe, which, as will be known to those skilled in the art, is a probe that can be clamped around a motor lead to perform non-contact current measurements, without interrupting the circuit under test.

The pump may be connected with a source 34 of coolant that is pumped through the pump in order to cool the pump 10. The source 34 may be mains pressure water, which is directed to a drain once it has passed through the pump. Another option is that the source 34 could be a part of a recirculating cooling system that includes a heat transfer device in which the coolant circulating through the pump is cooled by a heat transfer process. Suitable recirculating cooling systems will be well known to those skilled in the art and will not therefore be described in further detail herein. The system includes some means, typically valving such as an electrically controlled valve 35, which allows the controller 26 to control the flow rate of the coolant to the pump.

A pressure sensor 32 is provided in the exhaust conduit 20. Any suitable sensor may be used. One example of a suitable sensor is a diaphragm connected with a strain gauge or gauges.

In use, the pump would function in the usual way, continuously or intermittently drawing gases from the processing chamber during the processing of products therein. During periods in which the pump is not in use, and in some cases even when the pump is in use, diagnostic tests may be carried out in order to provide data for assessing the condition of the pump and/or the pump system.

One such test is to determine the condition of the running clearances in the pump and the bearing condition. In this test, the controller 26 is switched to a test mode and runs the pump in such a way as to stress the pump. The pump can be stressed in various ways:

1) The pump can be run at its normal operating speed, the shaft speed then reduced for a predetermined period (say three minutes) followed by an increase above the normal operating speed for a predetermined period of time (say three minutes). The increase and decrease in speed could, for example, be 10% above and 10% below the normal operating speed.
2) Where the pump is fed with coolant from a source 34, the coolant flow could be reduced to, for example, 25% of the usual flow rate for, for example, 10 to 20 minutes. At the end of the reduced flow period, the flow rate would be restored to its usual level or possibly increased to a higher level to cause a perturbation of pump temperature.
3) Changing the gas flow rates through the pump, by, for example, increasing the flow rate by as much as 10 to 100 times the rate of that when the pump is in a usual operating mode. The duration of this increased throughput could, for example, be between 10 seconds and one minute
4) A combination of two or more of methods 1) to 3).

During a period in which the pump is under test, signals indicative of the current drawn by the motor 24 are provided by the sensor 30 and communicated to the controller 26 where they are stored in the memory. A program operated by the controller can then compare all or some of the data received from the sensor 30 during the test with pre-programmed data held in the memory and/or data received during previous tests. On the basis of this comparison, a prediction can be made of the remaining life of the pump before a defined pump condition should occur. If the result of the test is an indication that the pump may fail within a predetermined period, the pump should be replaced. In this connection, the controller 26 can be equipped in various ways to provide an indication of the result of the test. For example, the controller 26 could be linked to an audible device 36 that would provide an audible message indicating the need for pump replacement or that the pump is likely to fail within a specified period. In addition, or as an alternative, the controller 26 could be linked to a visual display device 38. The visual display device could be a simple warning light or a screen on which an indication of the test result could be displayed. As a further option, the visual display device 38 could comprise a printer.

If desired, if the test result indicates certain conditions of the pump, the controller 26 could be configured to render the system inoperable until such time as a manual override is operated or resetting takes place following servicing or replacement of the pump.

Another test can be carried out to determine the condition of the pump exhaust 18 and/or exhaust conduit 20. In this test, a high purge flow of gas, for example 100 standard litres minute, is injected into the pump 10 or the exhaust conduit 20 upstream of the area to be tested. It will be understood that the pressure sensor 32 will be positioned relative to the position or positions at which the gas is injected so as to provide signals suitable for determining the condition of the area to be tested and that it may be appropriate to provide a plurality of such sensors at spaced apart locations in order to provide the desired result. The injection period would be relatively short, for example, 10 seconds to 1 minute.

In FIG. 1, the gas is shown being injected into the conduit 20 at a position upstream of the pressure sensor 32 via a pipe 40. Injection into the pump is indicated by a dashed line representing a pipe 42. The purge gas will typically be nitrogen fed from a source of compressed nitrogen 44 but other gases and/or sources could be used instead. Valving 46 is provided in the pipe 40 by means of which the flow of the purge gas can be controlled. This valving will typically comprise a valve electrically controlled by the pump. In the case of injection into the pump itself, this test could be a part of method 2) of the stress test mentioned above and would be carried out when the pump is not in use. If the purge gas is injected into the exhaust, the test could be carried out when the pump is in use.

During a period in which the pump is under test, signals indicative of the pressure in the conduit 20 are provided by the pressure sensor 32 and fed to the controller 26 where they are stored in the memory. The controller 26 compares all or some of the received pressure data with the input gas flow rate and pre-programmed data and/or the data produced by previous tests to determine the level of blockage and/or useful service life of the pump exhaust/exhaust conduit 12. The above-described methods of providing an indication of the results of a stress test on the pump can be used to indicate the results of this test and similarly, the controller may be able to render the system inoperable if certain system conditions are indicated.

It will be appreciated that the system may be equipped so as to permit the controller to carry out one or both of the above described tests as desired and that where only one of the tests is required, the appropriate one of the sensors 30, 32 can be omitted from the arrangement shown in FIG. 1.

In the arrangement described above the tests are performed under the control of the controller 26, which is equipped to analyse the test results and to provide an indication as to the outcome of the test. However, the pump need not stand-alone and the testing regime can be integrated into a central system, which allows the test data to be analysed in connection with test data from other pumps. For this purpose, the pump may be connected to a network indicated in FIG. 1 by box 50. The connection to the network 50 may be via the controller 26. However, the pump may be directly connected to the network allowing a central controller to control the pump without a local controller for the pump.

The box 50 indicates a network system such as the FabWorks 16 or FabWorks 32 systems marketed by BOC Edwards. These systems permit the data collected from the sensors 30, 32 to be transmitted to a central hub where the data can be compared with pre-programmed data, previous test data from the pump under test and/or test data from other pumps. The FabWorks system can be enabled to provide a secure internet connection so that the data analysis can be carried out at a central hub operated by, for example, the pump manufacturer. Alternatively, the FabWorks system can be enabled to work on an intranet operated by the pump user. It will be understood that network systems other than the Fabworks systems could be used.

The tests should be performed relatively frequent to reduce the risk of the tests themselves causing the pump or pump system to fail. The controller 26 and/or central hub may be able to permit manual commands to initiate the performance of a test. However, to ensure reliable monitoring of the pump or pump system, it is preferred that additionally, or as an alternative, the tests are initiated automatically and for this purpose, the controller 26 or a computer of the central hub is preferably able to initiate the performance of a test at predetermined intervals. If the test is one that has to be performed when the pump is not in use, the controller 26 or computer is able to determine the use condition of the pump. If the result of the interrogation is that the pump is not able to be tested, the controller or computer will preferably be able to interrogate the pump again after further predetermined interval that is less, and preferably much less, than the usual predetermined interval between tests and this process may be repeated at intervals of decreasing length in the event the pump is still not in a condition to be tested. The above-described methods of providing an indication of the result of a stress test on the pump can also be used to provide an indication that it was not possible to conduct a scheduled test. Similarly, if it is determined that a test has not been conducted sufficiently recently, the controller or hub computer may be able to render the pump or pump system inoperable until some form of manual intervention has taken place.

In an alternative control strategy, the controller or hub computer may be enabled to detect when the pump has assumed an idle condition, and having detected an idle condition, would then check in a memory to determine when a test was last carried out. If a predetermined interval had elapsed since the last test or tests, the controller or hub would cause a new test or tests to be initiated. Of course, tests could be initiated whenever an idle condition is detected, but this would not be a preferred strategy.

One method of detecting the operating condition of the pump, that is whether the pump is idling or in use, would be to analyse the current drawn by the pump motor using signals from the sensor 30, although other indicators could be used.

It is preferred that the signals from the tests are used in an algorithm to produce an indication of the service life of the pump or pump system before a predetermined pump condition is likely to occur and in doing this, it is expected that the signals from the sensor during the most recent test will be compared with signals from previous tests, signals from the sensors of other pumps and/or pre-programmed data. However, in addition, or as an alternative, the signals from the most recent test may be analysed in isolation and a determination made on the indications from those signals. For example, if a threshold value is detected a determination may be made that servicing or replacement action should be taken. It is expected that such a regime would more likely be applied to the results of testing on the pump exhaust passage than on results of the pump stress test.

It will be appreciated that it is most likely the testing procedures will be implemented by means of software loaded into the controller or a computer of the hub and that this, together with the fact that sensors such as a current clamp or pressure transducer, can be incorporated with relative ease, means that the monitoring method can readily be applied to existing pumps and systems. For example, the software for implementing the method may be provided on data carrying mediums such as a floppy disc or compact disc. Another option is for the software to be downloaded via the internet or an intranet. Yet another option is for the code to be incorporated in a chip which can be substituted for an existing chip in a controller by itself or more likely as part of a replacement card.

Figure 2:
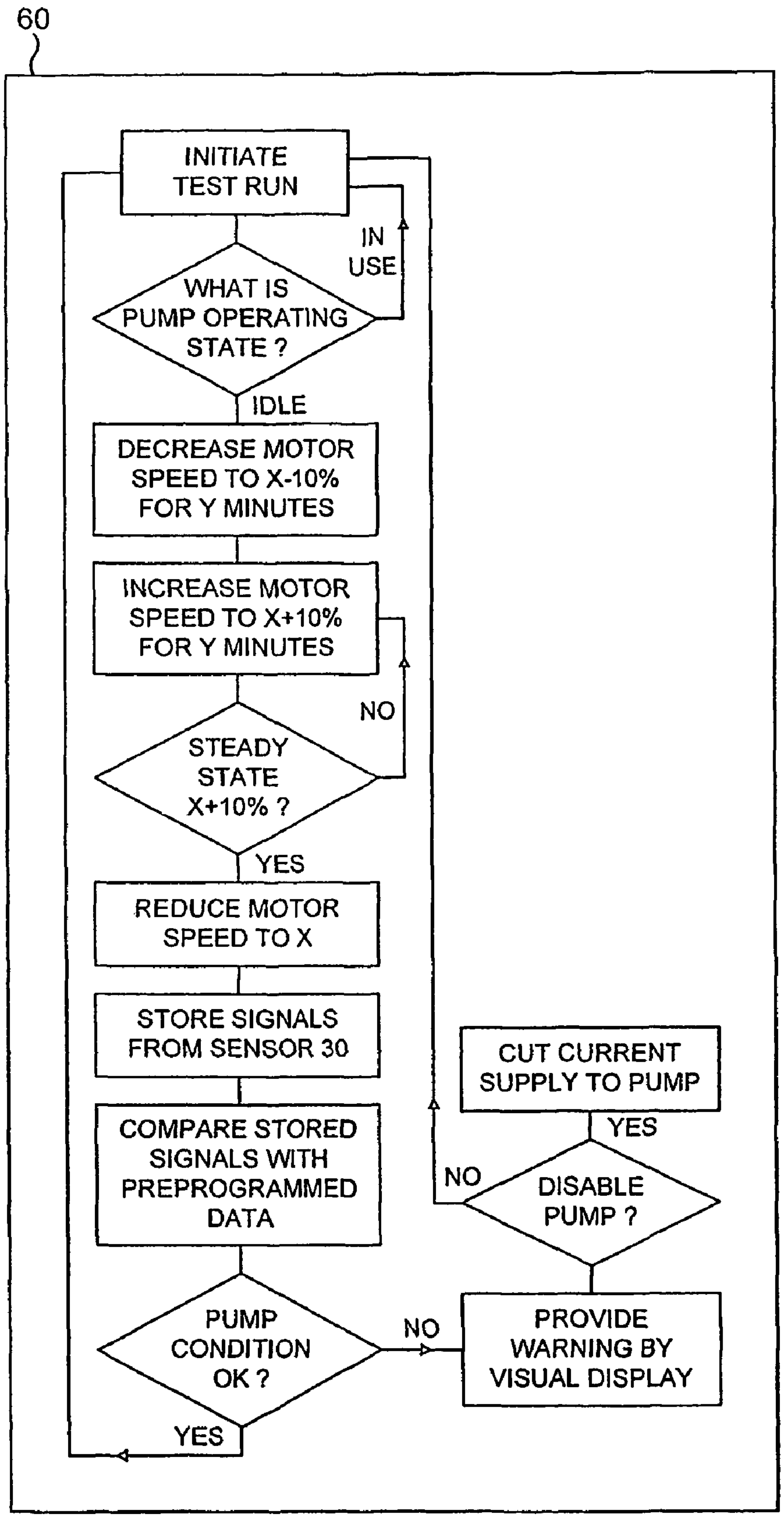
FIG. 2 is a flow diagram illustrating a sub-routine carried on a data carrier for use in implementing a pump monitoring method.

It will be understood that software for implementing the monitoring system may take many forms and that many possible routines and algorithms could be developed. An example of a sub-routine held on a data or carrier 60 in the form of a floppy disc is shown in FIG. 2. It will be seen that the sub-routine implements the pump stressing method 2) described above and provides for disabling of the pump in the event the pump condition is determined as not meeting an 'OK' condition. By way of an example, a determination that the 'OK' condition is not met could be based on the occurrence of two successive tests that indicate the pump is approaching a failure condition, although of course many other criteria could be used.

It will be understood that the system and methods described above can be modified in many ways. For example, transducers may be provided for use in controlling the electrically controlled valving 35, 46 to create a feedback loop by which the valving can be more precisely controlled. Examples of such transducers are temperature sensors for sensing the temperature of the pump or coolant after it has flowed from the pump, or flow sensors for sensing the coolant or purge gas flow or the gas flow in the conduit.

It will be appreciated that the data collected during the tests may be used to provide an indication of other areas of the pump or system. For example, the signals obtained from the conduit 20 may be used to assess the amount of blockage in the conduit and also of parts of the pump as there should be a correlation between the two.

It will also be appreciated that the control strategy may be such that signals from the sensors are sampled only at predetermined periods during testing of the pump or system to ensure that the signals are representative of a period in which the predetermined test condition has actually been achieved. Another option would be to disregard the obtained signals until such time as a predetermined threshold value is obtained.

We claim:

1. A method of monitoring the condition of a pump the method comprising the steps of:

generating a predetermined test condition in the pump, comprising generating and sustaining for a substantial period of time an abnormal pump speed outside a range of normal pump operation speed whereby the pump is subject to an increased stress as compared with normal operating stresses, thereby causing a reduction in clearance between a rotor and a stator of the pump; and obtaining signals indicative of an amount of the clearance between the rotor and the stator of the pump during a period in which the test condition is present, wherein the signals are derived from a current consumed by a motor driving the rotor of the pump, wherein the reduction in clearance is caused by the steps of causing a predetermined reduction in rotor rotation speed from a selected speed for a predetermined period of time and then causing a predetermined increase in rotor rotation speed above the selected speed for a predetermined period of time.

2. The method as claimed in claim 1, wherein the pump is equipped to store the signals.

3. The method as claimed in claim 1, wherein the signals are transmitted to a storage location via a LAN or the internet.

4. The method as claimed in claim 1, wherein the signals are analyzed to assess the condition of the pump.

5. The method as claimed in claim 4, wherein the analyzing step comprises comparing the signals with signals obtained during at least one previous predetermined test condition of the pump or system component.

6. The method as claimed in claim 4, wherein the analyzing step comprises comparing the signals with pre-programmed data.

7. The method as claimed in claim 4, wherein the analyzing step comprises comparing the signals with signals obtained from at least one other pump or like system component of another system during at least one predetermined test condition of the other pump or system component.

8. The method as claimed in claim 4, wherein the analyzing step comprises inputting the signals into an algorithm to provide a prediction of pump or system component condition.

9. The method as claimed in claim 4, wherein the analyzing step comprises inputting the signals into an algorithm to provide a prediction of pump or system component life until a predetermined condition of the pump or system component will occur.

10. The method as claimed in claim 4, wherein signals indicative of a system component condition are obtained and the analyzing step includes using the signals to predict a condition of the pump or system.

11. The method as claimed in claim 4, further comprising providing an audible indication of the result of the analyzing step.

12. The method as claimed in claim 4, further comprising providing a visual indication of the result of the analyzing step.

13. The method as claimed in claim 4, wherein the pump is automatically closed down if the analyzing step indicates a predetermined condition of the pump.

14. The method as claimed in claim 1, wherein the pump is able to determine whether the pump is in a condition that permits testing of the pump.

15. The method as claimed in claim 14, wherein the determining step is performed at predetermined intervals.

16. Apparatus claimed in claim 1, wherein the sensing device comprises a current sensing device for sensing current consumed by the motor that drives the pump.

* * * * *